(12) United States Patent
Ohta et al.

(10) Patent No.: US 11,358,244 B2
(45) Date of Patent: Jun. 14, 2022

(54) ASSEMBLING APPARATUS

(71) Applicant: SHIBUYA CORPORATON, Kanazawa (JP)

(72) Inventors: Masato Ohta, Kanazawa (JP); Takashi Miyazaki, Kanazawa (JP); Yusuke Shimizu, Kanazawa (JP)

(73) Assignee: SHIBUYA CORPORATION, Kanazawa (JP)

( * ) Notice: Subject to any disclaimer, the term of this patent is extended or adjusted under 35 U.S.C. 154(b) by 60 days.

(21) Appl. No.: 16/885,822

(22) Filed: May 28, 2020

(65) Prior Publication Data
US 2020/0376616 A1 Dec. 3, 2020

(30) Foreign Application Priority Data

May 28, 2019 (JP) .............................. JP2019-099795
May 28, 2019 (JP) .............................. JP2019-099796
May 28, 2019 (JP) .............................. JP2019-099797

(51) Int. Cl.
*B23P 19/04* (2006.01)
*B65B 55/02* (2006.01)
*B65B 39/12* (2006.01)

(52) U.S. Cl.
CPC .................................... *B23P 19/04* (2013.01)

(58) Field of Classification Search
CPC ..... B23P 19/04; B65B 7/2857; B65B 7/2807; B65B 3/003; B65B 43/46; B65B 39/12; B65B 55/027
See application file for complete search history.

(56) References Cited

U.S. PATENT DOCUMENTS

| 8,311,352 B2 * | 11/2012 | Nishikawa | ........... H04N 19/593 382/238 |
| 2010/0060042 A1 * | 3/2010 | Budek | ................... B23P 19/008 296/214 |
| 2010/0080480 A1 * | 4/2010 | Nishikawa | ............. H04N 19/46 382/238 |

FOREIGN PATENT DOCUMENTS

| EP | 2599721 A2 * | 6/2013 | ............. B65B 35/16 |
| JP | H0551087 A * | 3/1993 | ............... B67C 3/24 |
| JP | H05051087 A | 3/1993 | |

* cited by examiner

*Primary Examiner* — Bayan Salone
(74) *Attorney, Agent, or Firm* — Flynn Thiel, P.C.

(57) ABSTRACT

An assembling apparatus efficiently performs a recovery operation and a parts size change operation. A filling line (the assembling apparatus) has parts supply units that supply parts, assembling units that mount one of the parts to another part, and a conveying unit that individually moves carriers 12 capable of storing parts constituting an assembly. The parts supply units are provided at positions away from the assembling units, the assembling units are accommodated in an isolator having an interior maintained in an aseptic state, and gloves to perform an operation on the assembling units are provided on a side surface of the isolator. The supply units store the parts in one of the carriers, the carrier then moves into the isolator, and the assembling units take the part from the carrier, and mounts the part to the other part stored in the same carrier.

5 Claims, 6 Drawing Sheets

ASSEMBLING APPARATUS

BACKGROUND OF THE INVENTION

Field of the Invention

The present invention relates to an assembling apparatus, and more particularly to an assembling apparatus that forms an assembly comprising a plurality of parts.

Description of the Related Art

Heretofore, as an assembling apparatus that forms an assembly comprising a plurality of parts, there has been known an assembling apparatus for mounting one part (a cap) to another part (a container) to be conveyed by conveying unit (Japanese Patent Laid-Open No. H05-051087).

This assembling apparatus of Japanese Patent Laid-Open No. H05-051087 includes a capper that mounts the cap to the container, as the assembling unit, and supply unit for supplying the cap is connected to the capper.

Here, the assembling apparatus of Japanese Patent Laid-Open No. H05-051087 described above also comprises a filling unit for filling the container with a liquid. However, it is also known that as a device filled with the liquid and sealed under an aseptic state, the filling unit or the capper is disposed in an isolator having an interior maintained in the aseptic state.

SUMMARY OF THE INVENTION

Technical Problem

However, if an assembling apparatus, including a configuration where a supply unit directly supplies parts to such an assembling unit as in Japanese Patent Laid-Open No. H05-051087 described above, is accommodated in an isolator, the following problem occurs.

That is, a connecting portion between the assembling unit and the supply unit includes a complicated configuration to supply the parts, and hence an abnormality easily occurs during the supply of the parts. When the abnormality occurs, a complicated operation is required to recover a normal state, and an operator has to enter the isolator.

Similarly, for example, the connecting portion between the assembling unit and the supply unit is required to be replaced or adjusted in the case of a parts size change in accordance with a shape of the parts, but includes a complicated structure, and hence the operator has to enter the isolator.

Furthermore, after an end of a recovery operation or a parts size change operation performed by the operator who enters the isolator, an interior of the isolator has to be decontaminated anew. Consequently, there is a problem that much time is taken to restart these devices and efficiency is poor.

In view of these problems, according to the present invention, provided is an assembling apparatus capable of efficiently performing a recovery operation and a parts size change operation and also capable of efficiently forming an assembly.

Solution

That is, an assembling apparatus according to the invention is an assembling apparatus that forms an assembly comprising a plurality of parts, the assembling apparatus being characterized by comprising:

one carrier that can store the plurality of parts constituting the assembly, a parts supply unit for supplying the parts to the carrier, an assembling unit for mounting one of the parts to another part, and a conveying unit for moving the carrier, wherein the parts supply unit and the assembling unit are provided at positions away from each other, the assembling unit is accommodated in an isolator having an interior maintained in an aseptic state, gloves to perform an operation on the assembling unit are provided on a side surface of the isolator, and the supply unit supplies the parts constituting the assembly to the one carrier, the carrier then moves into the isolator, and the assembling unit takes the part from the carrier, and mounts the part to the other part stored in the same carrier.

Advantageous Effects

According to the invention, when the supply unit supplies the parts to the carrier, the carrier moves to the assembling unit, to supply the parts to the assembling unit.

Consequently, it is not necessary to provide a connecting portion between the supply unit and the assembling unit in the isolator, and a configuration of the assembling unit in the isolator can be simplified.

As a result, a probability of occurrence of an abnormality that occurs in the isolator can be decreased. Furthermore, it is possible to simplify a parts size change operation. Consequently, it is possible for an operator to perform a recovery operation or a parts size change operation during the occurrence of the abnormality or during a parts size change, by use of gloves from outside the isolator.

In other words, it is not necessary to decontaminate the isolator again after these operations. Consequently, it is possible to restart the apparatus immediately after the end of these operations, and it is possible to perform efficient production.

DETAILED DESCRIPTION OF THE PREFERRED EMBODIMENTS

Figure 1:
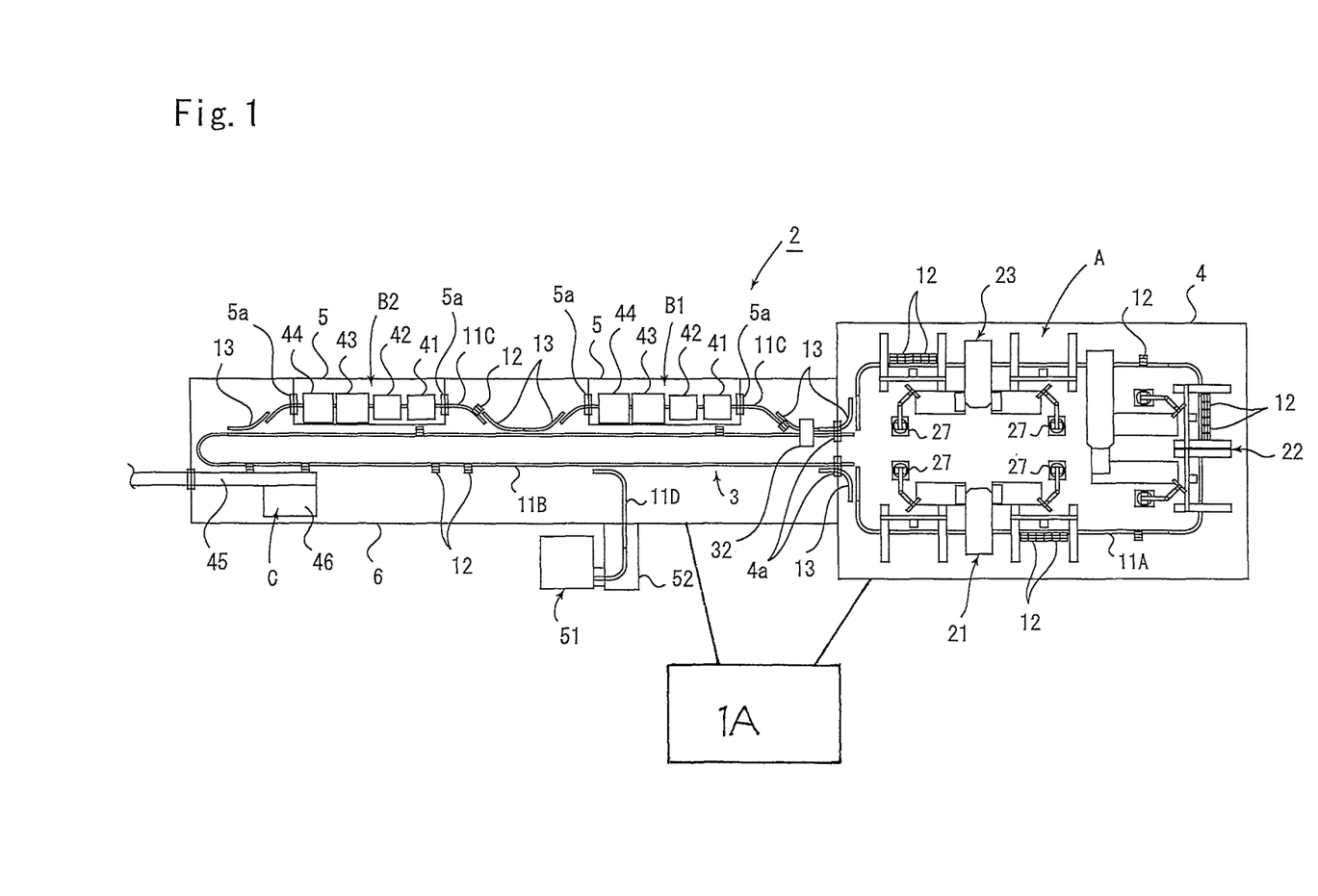
FIG. 1 is a plan view of a filling line according to an embodiment of the present invention.

Hereinafter, an embodiment shown in the drawings will be described. FIG. 1 shows a filling line 2 that fills an eyedrops container 1 as an assembly with eyedrops, and further performs capping.

Figure 6A:
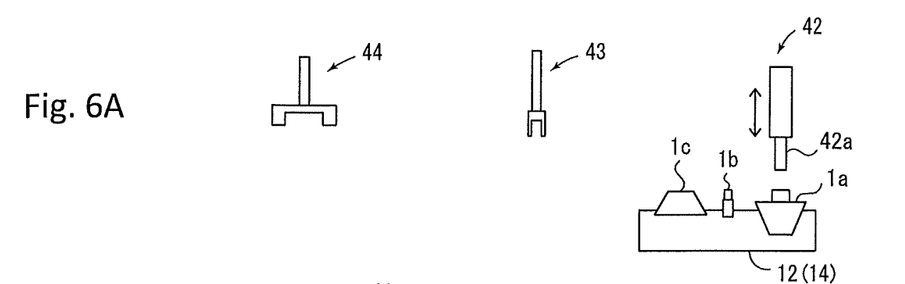
FIGS. 6A-6E are explanatory views of an operation in a filling and plugging section.
Figure 6B:
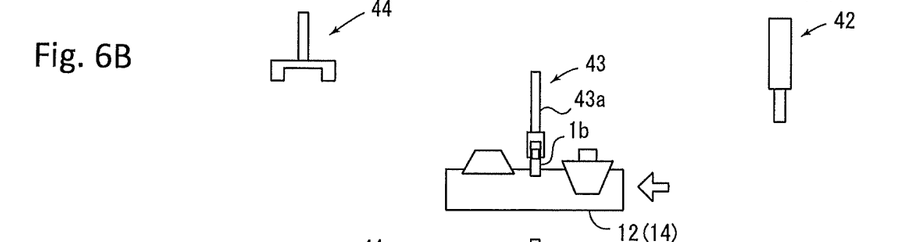
Figure 6C:
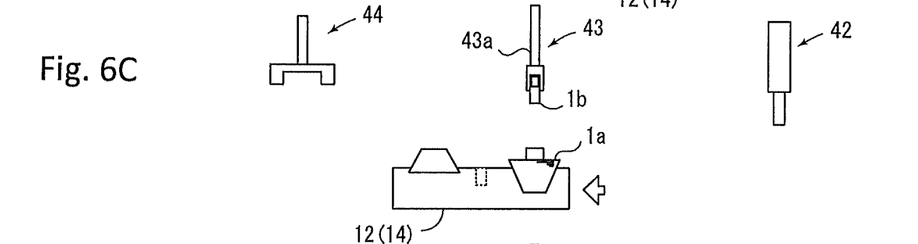
Figure 6D:
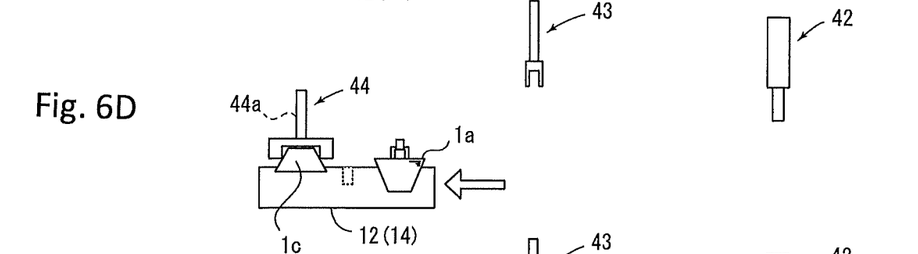
Figure 6E:
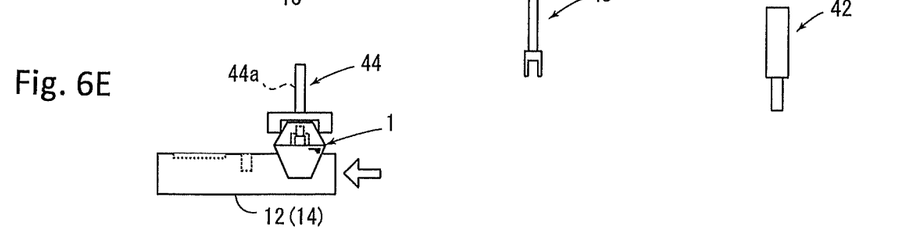

As shown in FIG. 6E, the eyedrops container 1 comprises a plurality of parts, and specifically comprises a container part 1a as a main part containing a medicine, an inner plug 1b as a mounting part mounted to a mouth part of the container part 1a to dispense medicine drops one by one, and a cap 1c as a mounting part mounted to the mouth part.

Figure 2A:
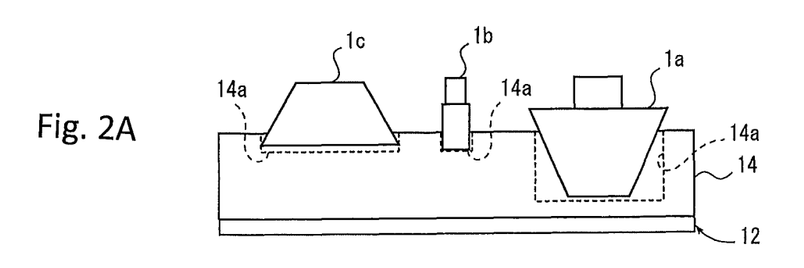
FIGS. 2A and 2B are a pair of front views showing a holder of a carrier and parts to be held in the holder.
Figure 2B:
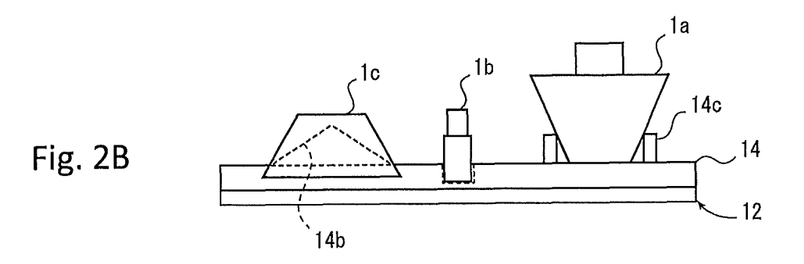
Figure 3:
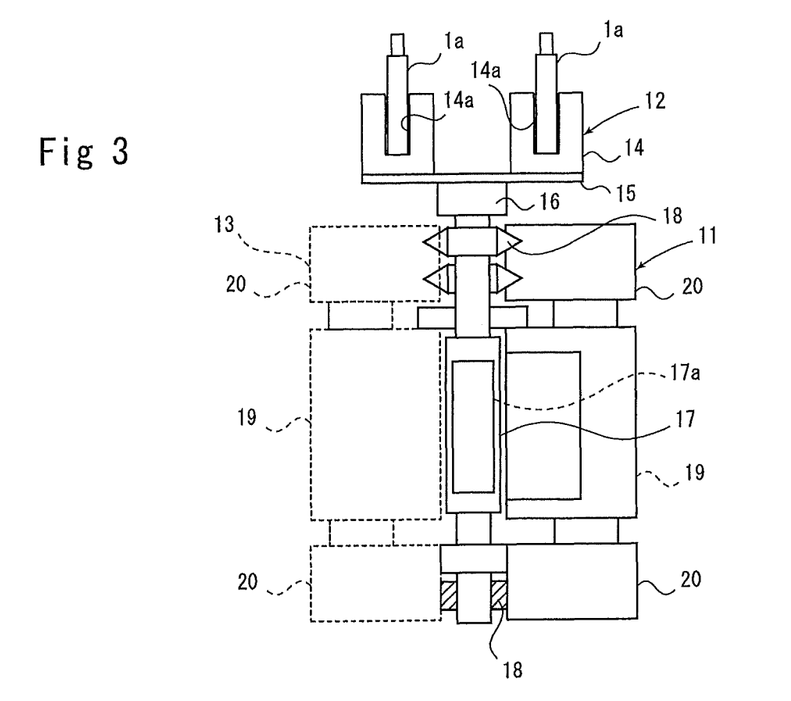
FIG. 3 is a side view showing a carrier and a rail.

The container part 1a has an almost trapezoidal shape having a top that is longer than a bottom as shown in the front views in FIGS. 2A and 2B, while having an almost rectangular shape having a predetermined thickness as shown in the side view in FIG. 3. Furthermore, the cylindrical mouth part is formed to extend upward, in a center of an upper part of the container part 1a.

The inner plug 1b is made of a resin and has an almost columnar shape, and the inner plug 1b is pressed into the mouth part from above, so that the inner plug 1b can be mounted to the container part 1a.

Additionally, the cap 1c has an almost trapezoidal shape having a top that is shorter than a bottom in a front view, and has an almost rectangular shape having a predetermined thickness.

In the cap 1c, an engagement portion is formed to engage with an outer peripheral portion of the mouth part of the container part 1a. In a structure to mount the cap 1c to the container part 1a, the cap 1c may be brought into contact under pressure with the container part 1a by applying a predetermined pressure from above. In other words, when mounting the cap 1c, it is not necessary to rotate the cap 1c relative to the mouth part in the structure.

When the cap 1c is mounted to the container part 1a, a top of the container part 1a comes in contact closely with a bottom of the cap 1c, so that the eyedrops container 1 having an almost hexagonal shape in side view can be obtained (see FIG. 6E).

Note that the eyedrops container 1 including the configuration has been heretofore known, and hence a detailed description of a structure including the inner plug 1b and the cap 1c is omitted.

The filling line 2 comprises a parts supply part A that supplies the parts constituting the eyedrops container 1, two filling and plugging parts B1, B2 that fill the container part 1a with the medicine and mount the inner plug 1b and the cap 1c to the container part, a discharge part C that discharges the eyedrops container 1 to which the cap 1c is mounted, and conveying unit 3 for conveying the parts and the eyedrops container 1 to circulate through the parts supply part A, the filling and plugging parts B1, B2, and the discharge part C, which are controlled by a control unit 1A shown diagrammatically in FIG. 1.

In the present embodiment, the parts supply part A is accommodated in a parts supply isolator 4 having an interior maintained in an aseptic state, and the two filling and plugging parts B1, B2 are also accommodated in filling and plugging isolators 5, each of which has an interior maintained in the aseptic state.

A part of the discharge part C or the conveying unit 3, other than the parts supply part A and the filling and plugging parts B1, B2, is accommodated in a clean booth 6 having an interior maintained to be cleaner than an exterior.

In the present embodiment, the parts supply isolator 4 is provided adjacent to the clean booth 6, while the filling and plugging isolator 5 is provided in the clean booth 6.

Furthermore, at a connecting position between the parts supply isolator 4 and the clean booth 6, communication ports 4a are formed to such an extent that the parts or the like to be conveyed by the conveying unit 3 can pass through the ports. The filling and plugging isolator 5 is also formed with communication ports 5a through which the parts or the like can pass.

The two filling and plugging isolators 5 are provided in the clean booth 6. However, one side surface constituting each of the filling and plugging isolators 5 is formed integrally with a side surface of the clean booth 6, and the side surface is exposed to the outside.

The exposed side surface comprises a transparent acrylic plate, and the acrylic plate is provided with unshown gloves that an operator can wear. Consequently, the operator can perform an operation in the filling and plugging isolator 5, by use of the gloves from the outside.

Furthermore, each of the parts supply isolator 4 and the filling and plugging isolators 5 comprises an unshown aseptic air supply unit for supplying aseptic air to the interior, and a required positive pressure is set to the interior. Additionally, the required positive pressure is also set in the clean booth 6.

In addition, an inner pressure of each of the parts supply isolator 4 and the filling and plugging isolators 5 is set to be more positive than an inner pressure of the clean booth 6, and dust and the like generated in the clean booth 6 are prevented from intruding into the parts supply isolator 4 and the filling and plugging isolators 5.

The conveying unit 3 comprises a rail 11 constituting a conveying track provided in an endless manner, and a plurality of carriers 12 linearly driven along the rail 11. The control unit 1A can individually control positions and moving speeds of the respective carriers 12.

The rail 11 includes an almost C-shaped parts supply section 11A provided in the parts supply isolator 4, an almost U-shaped conveying section 11B provided in the clean booth 6, and a filling and plugging section 11C provided in the filling and plugging isolator 5.

Among these sections, the parts supply section 11A and the conveying section 11B constitute an annular circulation path, while the filling and plugging section 11C is provided to branch from the conveying section 11B.

In this way, the parts supply section 11A and the filling and plugging section 11C are provided at positions away from each other, but each of the carriers 12 circulates and moves between the parts supply section 11A and the filling and plugging section 11C while moving through the conveying section 11B.

Furthermore, opposite end portions of the parts supply section 11A are slightly away from opposite end portions of the conveying section 11B, and opposite end portions of the filling and plugging section 11C are also provided slightly away from the conveying section 11B. However, the carrier 12 is transferred between these portions disposed away from each other by a connection rail 13 provided between the portions.

As shown in FIGS. 2A, 2B and FIG. 3, each of the carriers 12 comprises a holder 14 that stores the parts, a plate-like base member 15 supporting the holder 14, a pillar member 16 provided on a lower surface of the base member 15, a shuttle 17 provided in an almost center of the pillar member 16 and containing a permanent magnet 17a, and two sets of rollers 18 provided above and below the shuttle 17.

Recesses 14a are formed in an upper surface of the holder 14 in accordance with shapes of the parts, and the container part 1a as the main part and the inner plug 1b and the cap 1c as the parts are received in the recesses 14a in order from the end portion on an upstream side in a conveying direction.

Furthermore, among the recesses 14a of the holder 14, the recesses 14a that receive the container part 1a and the cap 1c are formed so that orientations of the received container part 1a and the received cap 1c match each other.

Additionally, as shown in FIG. 3, two holders 14 are provided in parallel on an upper surface of the base member 15, and one carrier 12 can convey two sets of parts.

Note that as shown in FIG. 2B, an upper portion of the holder 14 is provided with a protrusion 14b or a sheath 14c that fits in a bottom of the cap 1c or the container part 1a, and these parts may be positioned by the protrusion 14b or the sheath 14c instead of the recesses 14a shown in FIG. 2A.

As shown in FIG. 3, the rail 11 comprises an electromagnetic coil 19 provided on a side of the shuttle 17, and guides 20 provided above and below the electromagnetic coil 19 to abut on the rollers 18 of the carrier 12.

The rollers 18 of the carrier 12 abut on the guides 20 of the rail 11, and then a constant gap is formed between the electromagnetic coil 19 and the shuttle 17. In this state, a magnetic force is generated from the electromagnetic coil 19, so that the carrier 12 can be linearly driven.

Note that the conveying unit 3 for linearly driving and moving the carrier 12 has been heretofore known, and hence further detailed description concerning the linear driving is omitted.

The rail 11 shown by a solid line in FIG. 3 indicates the rail 11 constituting the parts supply section 11A or the conveying section 11B, or the rail 11 constituting the filling and plugging section 11C. The connection rail 13 is shown by a broken line on a side opposite to the rail 11 shown by the solid line via the carrier 12.

The connection rail 13 also comprises the electromagnetic coil 19 and the guides 20 in the same manner as in the rail 11 constituting the parts supply section 11A or the conveying section 11B. The control unit 1A controls the electromagnetic coil 19, so that the carrier 12 can be moved along the connection rail 13.

According to this configuration, when the carrier 12 is located between the rail 11 of the parts supply section 11A and the connection rail 13, the control unit 1A demagnetizes the electromagnetic coil 19 of the rail 11 of the parts supply section 11A. On the other hand, the control unit 1A can activate the electromagnetic coil 19 of the connection rail 13, to transfer the carrier 12 from the parts supply section 11A to the connection rail 13.

Afterward, the carrier 12 moved to the connection rail 13 is located between the rail of the parts supply section and the rail 11 of the conveying section 11B, and then the control unit 1A demagnetizes the electromagnetic coil 19 of the connection rail 13. On the other hand, the control unit 1A can activate the electromagnetic coil 19 of the rail 11 of the conveying section 11B, to transfer the carrier 12 from the connection rail 13 to the conveying section 11B.

To branch the carrier 12 from the conveying section 11B to the filling and plugging section 11C, the arbitrary carrier 12 is branched to the filling and plugging section 11C by the connection rail 13, and the other carriers 12 can be moved along the conveying section 11B as they are, to pass the filling and plugging section 11C.

That is, in the case of branching the carrier 12 from the conveying section 11B to the filling and plugging section 11C, when the carrier 12 approaches the connection rail 13, the control unit 1A may activate the electromagnetic coil 19 of the connection rail 13, to transfer the carrier 12 to the filling and plugging section 11C.

On the other hand, in a case where the carrier 12 passes the filling and plugging section 11C, the control unit 1A does not activate the electromagnetic coil 19 of the connection rail 13, and may continue to activate the electromagnetic coil 19 of the rail 11 of the conveying section 11B.

The parts supply part A comprises a cap Supply unit 21, an inner plug supply unit 22 and a container supply unit 23 as a supply arrangement provided along the parts supply section 11A of the conveying unit 3. Note that an order of these supply units does not have to be the described order.

Hereinafter, the container supply unit 23 will be described with reference to FIG. 4 and FIG. 5. However, the cap supply unit 21 and the inner plug supply unit 22 also include similar configurations, and hence a detailed description of these is omitted.

The container supply unit 23 comprises a hopper 24 that supplies the container parts 1a, a conveyor 25 that conveys the container parts 1a, a camera 26 that photographs the container parts 1a on the conveyor 25, a robot 27 holding the container parts 1a on the conveyor 25, and a delivery unit 28 for receiving the container parts 1a from the robot 27 to store the container parts in the carriers 12.

Figure 4:
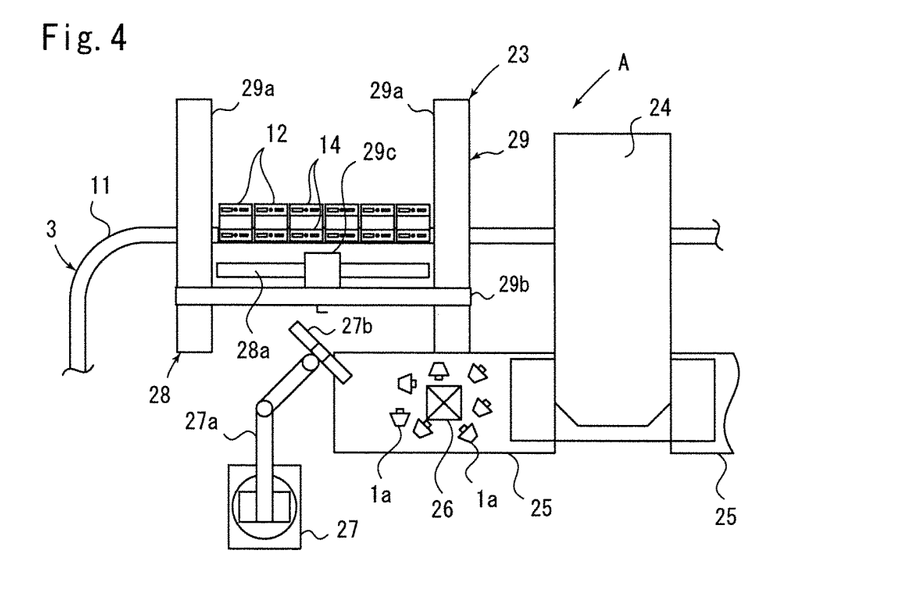
FIG. 4 is a plan view to explain the container supply unit.
Figure 5:
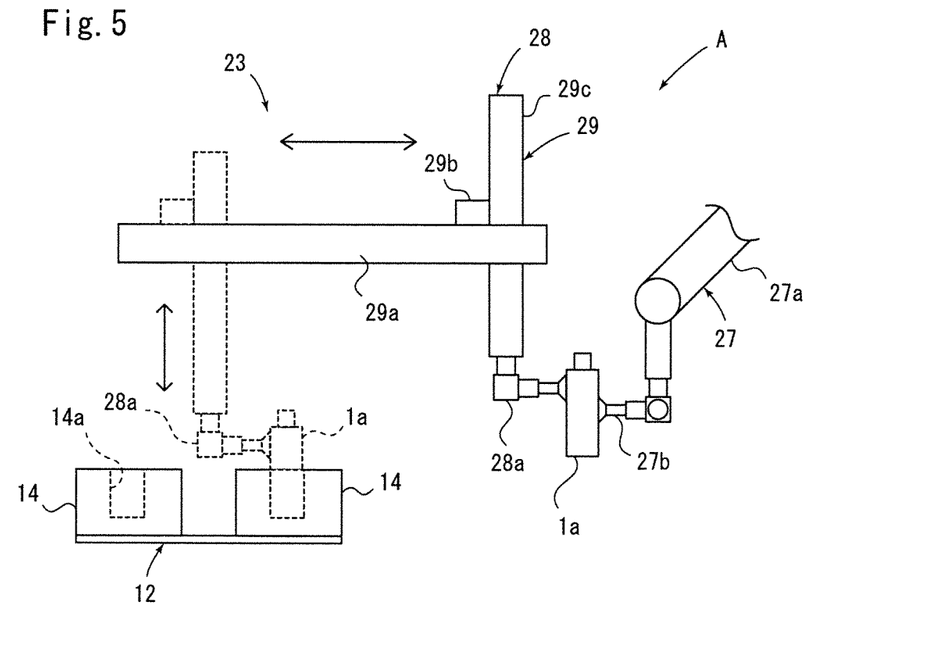
FIG. 5 is a side view to explain the container supply unit.

Among these components, the conveyor 25, the camera 26, the robot 27 and the delivery unit 28, excluding the hopper 24, are symmetrically provided toward the upstream side and a downstream side in the conveying direction of the carrier 12 by the conveying unit 3, around the hopper 24 as shown in FIG. 4. Note that FIG. 4 mainly shows a configuration on the downstream side in a moving direction of the carrier 12.

The conveying unit 3 is configured to stop twelve carriers 12 to the container supply unit 23. Specifically, six carriers 12 are stopped relative to each of two delivery units 28.

In the hopper 24, the container parts 1a (sterilized in advance) are stored, and the container parts 1a are discharged to the conveyor 25 provided below a discharge port of the hopper 24.

The discharged container parts 1a on the conveyor 25 are directed in random directions, and are therefore photographed with the camera 26, so that the control unit 1A recognizes a position and orientation of each container part 1a from a photographed image.

The robot 27 comprises an arm 27a, and a chucking head 27b provided at a tip of the arm 27a, and the chucking head 27b is connected to unshown negative pressure generation unit.

A position and orientation of the eyedrops container 1 on the conveyor 25 are recognized, and then the control unit 1A controls the robot 27 to move the chucking head 27b in accordance with the position and orientation of the container part 1a, so that a required portion of the container part 1a is chucked and held.

In the present embodiment, for example, two container parts 1a can be chucked and held with the chucking head 27b, and a space between the chucked and held container parts 1a is set to the same space as a distance between the recesses 14a formed in the respective holders 14 in two aligned carriers 12.

Then, while raising the chucked container part 1a, the robot 27 rolls over the chucking head 27b, and moves the standing container part 1a to a delivery position adjacent to the delivery unit 28.

The delivery unit 28 comprises a chucking head 28a that chucks and holds the container part 1a, and a moving unit 29 for moving the chucking head 28a in a horizontal direction and an up-down direction.

The chucking head 28a can chuck and hold six container parts 1a, and a space between the chucked and held container parts 1a is set to the same space as a distance between the recesses 14a formed in the respective holders 14 in six aligned carriers 12.

Consequently, while the chucking head 28a is on standby at the delivery position, the robot 27 moves the chucking head 27b a plurality of times, and delivers six container parts 1a to the chucking head 28a.

The moving unit 29 comprises two X-direction rails 29a provided orthogonally to the rail 11 of the conveying unit 3, a Y-direction member 29b provided movably in an X-direction along the X-direction rail 29a, and a Z-direction rail 29c provided in the up-down direction relative to the Y-direction member 29b, as shown in FIG. 4, and the chucking head 28a is provided to be movable up and down by the Z-direction rail 29c.

As described above, since the chucking head 28a chucks and holds six container parts 1a at the delivery position, the chucking head 28a is then moved in a direction orthogonal to the rail 11, and the chucking head 28a is only moved up and down. Consequently, the container parts 1a can be stored in the recesses 14a of the holders 14 in six carriers 12.

In other words, the chucking head 27b of the robot 27 and the chucking head 28a of the delivery unit 28 deliver the container part 1a in the same orientation as in the recess 14a formed in the holder 14 of the carrier 12, and hence the delivery unit 28 can store the container part 1a in the recess 14a without changing the orientation of the container part.

Furthermore, at a position adjacent to the upstream side of the filling and plugging parts B1, B2 in the conveying unit 3, a camera 32 is provided as a missing parts recognition unit for photographing the carriers 12 in which the parts are stored in the parts supply part A.

An image photographed with the camera 32 is recognized by the control unit 1A, and the control unit 1A determines whether or not there are the parts stored in the holders 14 of the carriers 12.

As a result of the determination, a missing part in either of the two holders 14 provided in the carrier 12 is recognized, and then the control unit 1A causes the carrier 12 having the missing part to pass the filling and plugging parts B1, B2, and to move through the conveying section 11B as it is.

Subsequently, the control unit 1A causes the carrier 12 having the missing part to pass the discharge part C, moves the carrier again to the parts supply part A, and stops the carrier 12 having the missing part together with the other carriers 12 sequentially in the cap supply unit 21, the inner plug supply unit 22 and the container supply unit 23.

At this time, the control unit 1A controls these supply units, and only supplies the missing part to the carrier 12 having the missing part without supplying the already stored part.

Consequently, even if a parts supply mistake is made in the parts supply part A, the carrier 12 having the missing part is circulated and moved again to the parts supply part A. It is therefore possible to replenish the carrier with the missed part without rejecting the part stored in the carrier 12 having the missing part.

The filling and plugging parts B1, B2 are accommodated in the filling and plugging isolators 5, respectively, and each of the sections comprises an air cleaner 41, a filling unit 42, an inner plug tapping unit 43, and a capper 44, in this order, from the upstream side in the conveying direction of the carrier 12 along the filling and plugging section 11C of the conveying unit 3.

The air cleaner 41, the filling unit 42, the inner plug tapping unit 43 and the capper 44 are provided at positions close to a wall surface of the filling and plugging isolator 5. The operator wears the gloves, and can therefore perform a required operation on these treatment units.

Consequently, the operator can perform a recovery operation to recover from an abnormality that occurs in the filling and plugging parts B1, B2, without entering the filling and plugging isolator 5. After the recovery from the abnormality, a sterilization operation in the filling and plugging isolator 5 is not required, and hence production efficiency of the whole filling line 2 can improve.

The air cleaner 41 comprises an injection nozzle that injects aseptic air, above the carrier 12 moved by the conveying unit 3, and injects the air to the parts stored in the carrier 12 from above, to remove dust and the like attached to the parts.

FIGS. 6A-6E are explanatory views of operations of the filling unit 42, the inner plug tapping unit 43 and the capper 44. The carrier 12 moves from the right toward the left as shown in the drawings, and the carrier 12 stores the container part 1a, the inner plug 1b and the cap 1c, Lin this order, from the most upstream side (the right shown in the drawing).

The filling unit 42 comprises a filling nozzle 42a connected to an unshown medicine supply unit provided outside the filling and plugging isolator 5, and an unshown lifting unit for moving the filling nozzle 42a up and down.

The inner plug tapping unit 43 comprises an inner plug gripper 43a as a holding head holding the inner plug 1b, and an unshown lifting unit for moving the inner plug gripper 43a up and down.

Similarly, the capper 44 comprises a capping head 44a as a holding head holding the cap 1c, and an unshown lifting unit for moving the capping head 44a up and down.

Furthermore, in the present embodiment, the carrier 12 is provided with two holders 14, and the parts are conveyed in two rows. Consequently, two filling nozzles 42a, two inner plug grippers 43a and two capping heads 44a are each provided in accordance with a space between the holders 14.

Hereinafter, description will be made as to a procedure of filling the container part 1a with the medicine and mounting the inner plug 1b and the cap 1c to the container part to assemble the eyedrops container 1 by the filling unit 42, the inner plug tapping unit 43 and the capper 44, with reference to the respective views of FIGS. 6A-6E.

FIG. 6A shows an operation wherein the filling unit 42 fills the container part 1a with the medicine. The control unit 1A stops the carrier 12 to locate the carrier under the filling unit 42 and to locate the mouth part of the container part 1a under the filling nozzle 42a.

Then, the filling nozzle 42a is lowered by the lifting unit, and a predetermined amount of medicine is discharged from the lowered filling nozzle 42a, to fill the container part 1a with the medicine.

FIG. 6B shows an operation wherein the inner plug tapping unit 43 takes the inner plug 1b from the carrier 12. The control unit 1A stops the carrier 12 to locate the carrier under the inner plug tapping unit 43 and to locate the inner plug 1b under the inner plug gripper 43a.

Then, the inner plug gripper 43a is lowered by the lifting unit, and the lowered inner plug gripper 43a holds the inner plug 1b.

FIG. 6C shows an operation wherein the inner plug tapping unit 43 provides the container part 1a with the inner plug 1b. The inner plug tapping unit 43 raises the inner plug gripper 43a once using the lifting unit, and in this state, the carrier 12 moves from a state of FIG. 6B to the downstream side, to stop the mouth part of the container part 1a under the inner plug gripper 43a.

Then, the inner plug gripper 43a is lowered by the lifting unit, fits the chucked and held inner plug 1b in the mouth part of the container part 1a, and completely fixes the inner plug 1b with a predetermined pressing force, to mount the inner plug to the container part 1a.

FIG. 6D shows an operation wherein the capper 44 takes the cap 1c from the carrier 12. The control unit 1A stops the carrier 12 to locate the carrier under the capper 44 and to locate the cap 1c under the capping head 44a.

Then, the capping head 44a is lowered by the lifting unit, and the lowered capping head 44a grips the cap 1c.

FIG. 6E shows an operation wherein the capper 44 mounts the cap 1c to the container part 1a. The control unit 1A moves the carrier 12 from a state of FIG. 6D to the downstream side, and stops the carrier to locate the mouth part of the container part 1a under the capping head 44a.

Then, the capping head 44a is lowered by the lifting unit, and fits the held cap 1c in the mouth part of the container part 1a, to mount the cap 1c to the container part 1a. Consequently, the eyedrops container 1 is assembled.

In this way, the filling unit 42, the inner plug tapping unit 43 and the capper 44 of the filling line 2 of the present embodiment comprise mechanisms that move up and down the filling nozzle 42a, the inner plug gripper 43a and the capping head 44a with the lifting unit, respectively.

According to such a configuration, the carrier 12 only locates the corresponding parts and container part 1a under the filling nozzle 42a, the inner plug gripper 43a and the capping head 44a, to enable filling with the medicine, taking the parts, and mounting the parts to the container part 1a.

That is, a mechanism that moves these holding heads in the horizontal direction is not required, and it is not necessary to accommodate a complicated mechanism such as a robot in the filling and plugging isolator 5.

Thus, the configurations of the filling and plugging parts B1, B2 are simplified, so that the probability of the occurrence of an abnormality in the filling and plugging parts B1, B2 can be decreased. Furthermore, even in a case where the abnormality occurs, it is possible to easily recover from the abnormality.

At this time, the operator can recover from the abnormality with the gloves provided in the filling and plugging isolator 5 from the outside, and can therefore perform the recovery operation while maintaining an aseptic environment. Time and labor to decontaminate the interior of the filling and plugging isolator 5 after the recovery can be saved.

Furthermore, relative to the holder 14 of the carrier 12 in the present embodiment, the container part 1a as the main part is stored on the upstream side in the conveying direction, and mounting parts such as the inner plug 1b and the cap 1c are stored on the downstream side of the container part.

In this way, the carrier 12 is only moved to the downstream side, so that the inner plug 1b and the cap 1c can be mounted to the container part 1a.

Conversely, in a case where the inner plug 1b and the cap 1c are stored on the upstream side of the container part 1a, for example, if the carrier 12 is not run backward to the upstream side in the conveying direction after the inner plug gripper 43a of the inner plug tapping unit 43 holds the inner plug 1b, the container part 1a cannot be moved and located under the inner plug gripper 43a. Consequently, the carrier 12 is moved in a complicated and inefficient manner.

The discharge part C comprises a belt conveyor 45 having one end provided inside the clean booth 6 and having the other end provided outside the clean booth 6, and a transfer unit 46 for moving the eyedrops container 1 stored in the carrier 12 onto the belt conveyor 45.

As the transfer unit 46, in addition to a heretofore known robot, for example, there may be used a device comprising a holding head capable of holding the eyedrops container 1 and moving unit for moving the holding head.

At this time, the control unit 1A can also stop the carrier 12 at a required position relative to the transfer unit 46, and hence the eyedrops container 1 can be transferred by the transfer unit 46 using a simple configuration.

Hereinafter, an operation of the filling line 2 including the configuration will be described.

The parts supply isolator 4 and filling and plugging isolator 5 have their interiors sterilized in advance, and a predetermined number of carriers 12 are prepared for the conveying unit 3 in advance.

First, the control unit 1A moves twelve carriers 12 to the parts supply part A each time, and moves the carriers to the inner plug supply unit 22 and the container supply unit 23 in order from the cap supply unit 21 located on the upstream side.

During the movement, in each of the cap supply unit 21, the inner plug supply unit 22 and the container supply unit 23, the robot 27 and the delivery unit 28 store the cap 1c, the inner plug 1b and the container part 1a in the holder 14 of the carrier 12. Consequently, the container part 1a, the inner plug 1b and the cap 1c are stored in the holder 14 in order from the upstream side in the conveying direction.

The parts are supplied to the carrier 12 in this manner, and then the control unit 1A moves the carrier 12 from the parts supply isolator 4 to the adjacent clean booth 6. In this case, the parts in the holder 14 are photographed with the camera 32 as the missing parts recognition unit.

The control unit 1A recognizes the missing part among the parts stored in the carrier 12 from the photographed image, and in a case where the missing part is recognized, the control unit 1A determines that the carrier 12 having the missing part is to pass the filling and plugging parts B1, B2.

The carrier 12 having the missing part passes the filling and plugging parts B1, B2 and the discharge part C, and moves again to the parts supply part A where the carrier 12 is replenished with the missed part.

It is recognized by the missing parts recognition unit that all the parts are stored in the carrier 12, and then the carrier is alternately moved to either of the two filling and plugging parts B1, B2.

Alternatively, for example, the carrier 12 may be moved only to one filling and plugging section B1, and the carrier 12 may not be moved to the other filling and plugging section B2.

In this case, while the filling with the medicine or the like is performed in the one filling and plugging section B1, a parts size change operation can be performed in the other filling and plugging section B2. This can be arbitrarily performed in accordance with a number of eyedrops containers 1 to be treated or operation efficiency.

The carrier 12 in which the parts are stored enters the filling and plugging isolator 5 and moves to the filling and plugging parts B1, B2, and then the air cleaner 41 first injects air to the parts stored in the carrier 12, to remove the dust and the like.

Subsequently, as shown in the respective views of FIGS. 6A-6E, the filling nozzle 42a of the filling unit 42, the inner plug gripper 43a of the inner plug tapping unit 43 and the capping head 44a of the capper 44 fill the container part 1a with the medicine, provide the inner plug 1b and mount the cap 1c while moving up and down.

At this time, the carrier 12 is linearly conveyed, stopped and located under the filling nozzle 42a, the inner plug gripper 43a and then capping head 44a, and the holding heads are only moved up and down. Consequently, the container part 1a can be filled with the medicine, and the inner plug 1b and the cap 1c can be held and mounted to the container part 1a.

When finishing filling with the medicine and mounting the inner plug 1b and the cap 1c in this manner, the carrier 12 is moved from the filling and plugging isolator 5 into the clean booth 6, to move to the discharge part C.

In the discharge part C, the transfer unit 46 takes the eyedrops container 1 from the carrier 12, and disposes this container onto the belt conveyor 45. Afterward, the eyedrops container 1 is conveyed to a process on the downstream side by the belt conveyor 45.

Then, the carrier 12, from which the eyedrops container 1 is taken, is moved again to the parts supply isolator 4 along the circulation path by the conveying unit 3, and the above described operation is repeated.

As described above, according to the filling line 2 of the present embodiment, even for the eyedrops container 1 having a shape that is hard to convey in a standing state, the parts constituting the eyedrops container 1 are conveyed in a state of being stored in the holder 14 for exclusive use, and hence the filling with the medicine and the mounting of the parts (assembling) can be performed in a stabilized state.

Additionally, the inner plug supply unit 22 and the cap supply unit 21 as the supply unit for supplying the parts are arranged away from the inner plug tapping unit 43 and the capper 44 as the assembling unit, respectively. Therefore, a mechanism to supply the parts from the supply unit to the assembling unit is not required.

As this mechanism, for example, a chute to supply the cap to the holding head is considered, but this chute is required to be replaced or adjusted in accordance with a shape of the parts, and has a complicated structure.

Such a mechanism is not required, and it is therefore possible to simplify a configuration of the assembling unit provided in the filling and plugging isolator 5.

Consequently, it is possible to quickly recover from the abnormality that occurs in the assembling unit, and it is also possible to simplify the operation during the parts size change. Therefore, the operation efficiency can improve.

In addition, the assembling unit is provided with the filling and plugging isolator 5 having the interior maintained in the aseptic state, but includes a simple structure as described above. Therefore, the operator who wears the gloves can perform the recovery operation or the parts size change operation from outside the filling and plugging isolator 5, and a decontaminating operation after these operations is not required.

Next, the filling line 2 of the present embodiment comprises a configuration to efficiently perform the parts size change to a different type of eyedrops container 1.

In FIG. 1, a carrier stocker 51 in which a plurality of carriers 12 are stored is removably provided at a position adjacent to the clean booth 6, and the carrier stocker 51 itself can be moved to another position with unshown casters or the like.

The carrier 12 stored in the carrier stocker 51 includes almost the same configuration as in the carrier 12 shown in FIGS. 2A, 2B and FIG. 3, but the recesses 14a in the holder 14 are formed in shapes capable of storing parts having different shapes from those of the eyedrops container 1 shown in the figures.

The conveying unit 3 comprises a carrier stocker section 11D that branches toward the carrier stocker 51, and an end portion of the carrier stocker section 11D is away from the rail 11 of the conveying section 11B, but can branch the required carrier 12 on the same principle as in the connection rail 13.

A sealed state against the outside is maintained inside the carrier stocker 51. It is possible to decontaminate an interior of the stocker by unshown decontamination means, and it is possible to decontaminate the stored carriers 12 and a holding head described later.

Additionally, between the carrier stocker 51 and the clean booth 6, provided is a connection passage 52 that communicates between an inner space of the carrier stocker 51 and the clean booth 6 without contaminating cleanliness of the clean booth 6.

For example, the carrier stocker 51 is connected to the connection passage 52 in a state where an opening in the connection passage 52 on a clean booth 6 side is closed, and an interior of the connection passage 52 is decontaminated in this state. Consequently, the communication between the carrier stocker and the clean booth can be achieved while maintaining the cleanliness.

Figure 7:
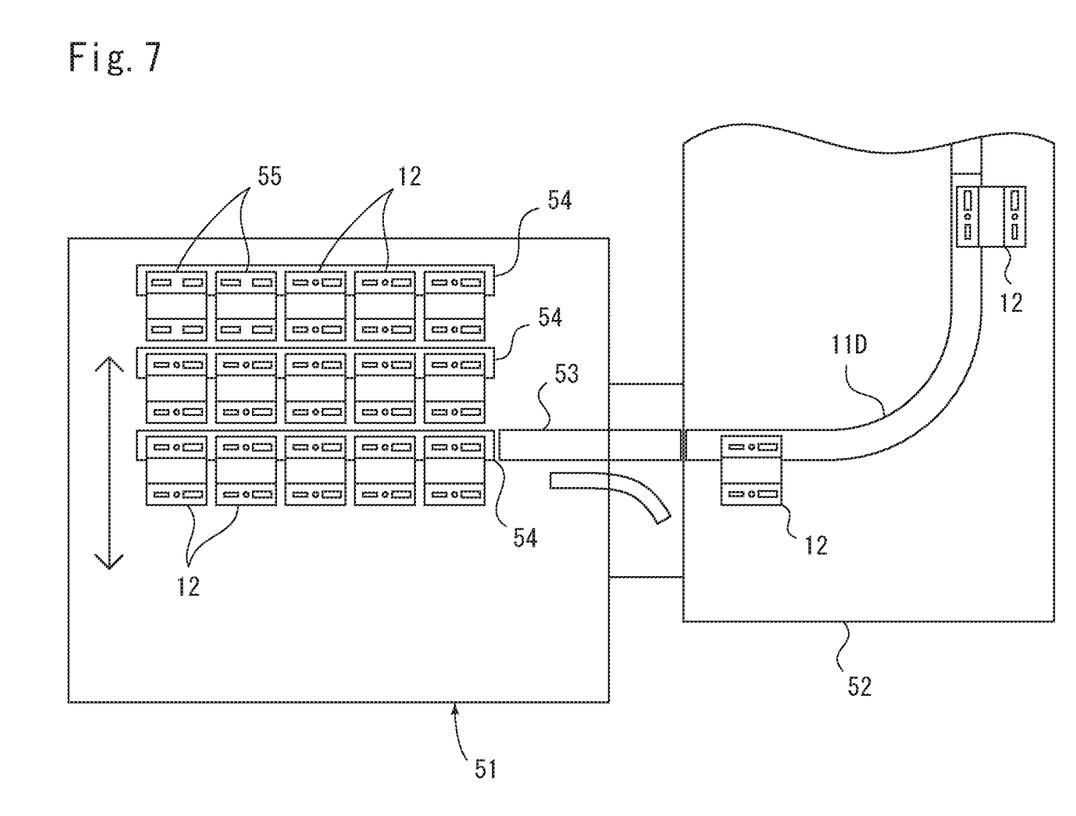
FIG. 7 is a plan view of a carrier stocker.

FIG. 7 provides a plan view showing the interior of the carrier stocker 51. The interior of the carrier stocker 51 comprises an inlet rail 53 connected to the carrier stocker section 11D of the conveying unit 3, and a plurality of moving rails 54 holding the plurality of carriers 12 and provided movably in the horizontal direction.

When the carrier stocker 51 is connected to the connection passage 52, an end portion of the inlet rail 53 is connected to the rail 11 of the carrier stocker section 11D provided in the connection passage 52.

The inlet rail 53 does not have to move the carriers 12 by the linear driving, and comprises a configuration that moves the carrier 12 located in an inlet of the carrier stocker 51 toward inside or outside the carrier stocker 51 by means such as a pusher.

Each of the moving rails 54 is horizontally moved by an unshown driving unit, to connect to and separate from the inlet rail 53, and the carrier 12 can be moved between the moving rail 54 and the inlet rail 53 in a state where the moving rail 54 is close to the inlet rail 53.

Furthermore, the moving rails 54 are horizontally moved, so that the plurality of moving rails 54 can be stored in the carrier stocker 51. Consequently, a predetermined number of carriers 12 can be stored.

Further in the carrier stocker 51 of the present embodiment, a head carrier 55 is also stored in which the capping head 44a to hold the cap 1c constituting the eyedrops container 1 after the parts size change can be stored.

Figure 8:
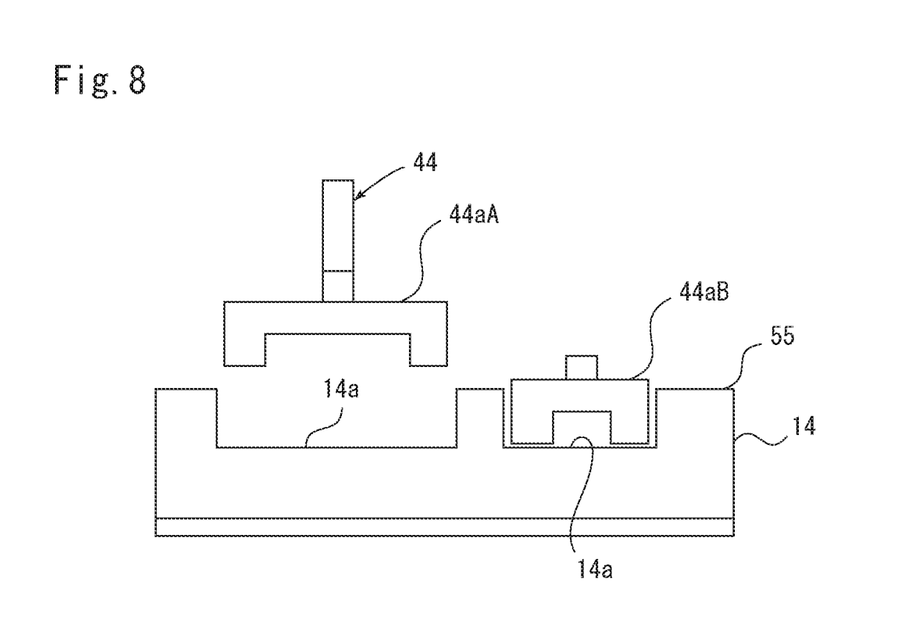
FIG. 8 is a side view of a head carrier.

FIG. 8 shows the head carrier 55. The head carrier 55 includes the same configuration as in the carrier 12 except for the holder 14 that stores the capping head 44a.

The head carrier 55 is also moved along the rail 11 by the linear driving in the same manner as in the carrier 12, and a position of the head carrier is controlled by the control unit 1A.

In the present embodiment, the same inner plug 1b can be used in the eyedrops container 1 before the parts size change and the eyedrops container 1 after the parts size change. Therefore, the head carrier 55 for the inner plug gripper 43a of the inner plug tapping unit 43 is not prepared. However, in a case where the parts size change is also required for the inner plug 1b, the head carrier 55 for the inner plug gripper 43a may be prepared.

The holder 14 is formed with a plurality of recesses 14a that can store an existing capping head 44aA as a first holding head mounted to the current capper 44 and a new capping head 44aB as a second holding head to hold the cap 1c of the eyedrops container 1 after the parts size change.

The capping heads 44aA, 44aB have a mechanism that can be coupled to the lifting unit of the capper 44. For example, when the lifting unit moves a member to be mounted to the capper 44 up and down, the member to be mounted can be connected to or separated from the capping heads 44aA, 44aB by use of heretofore known connection unit.

Note that also in a case where such connection unit is not provided, the carrier stocker 51 moves the capping head 44aA to the capper 44. Then, the operator who wears the gloves can replace the capping heads 44aA, 44aB, so that the parts size change can be efficiently performed.

A procedure of the parts size change by use of the carrier stocker 51 will be described. First in the parts supply part A, new parts constituting the new eyedrops container 1 are supplied to the hopper 24 for the container supply unit 23, the inner plug supply unit 22 and the cap supply unit 21, respectively.

At this time, for the container supply unit 23, the inner plug supply unit 22 and the cap supply unit 21, the robot 27 has versatility, and hence the parts size change is usually unnecessary. However, in a case where replacement is required, the operator enters the parts supply isolator 4 to replace the chucking head 27b, and sterilizes the interior of the parts supply isolator 4 in advance.

Subsequently, the carrier stocker 51 is moved and connected to the connection passage 52 of the clean booth 6, and the clean booth 6 communicates with the carrier stocker 51.

In the carrier stocker 51, the carrier 12 and the head carrier 55 stored inside are moved to the carrier stocker section 11D of the conveying unit 3, while moving the moving rails 54.

Then, the control unit 1A moves the new carrier 12 to the downstream side of the carrier stocker section 11D, and moves the hitherto used existing carrier 12, for example, to the upstream side of the filling and plugging parts B1, B2 or the conveying section 11B provided in parallel with the filling and plugging parts B1, B2.

In this state, the control unit 1A moves the head carrier 55 that stores the new capping head 44aB for the eyedrops container 1 after the parts size change, in a direction opposite to the usual conveying direction, and moves this head carrier to the filling and plugging section 11C provided with the filling and plugging parts B1, B2.

Subsequently, the control unit 1A moves and locates the head carrier 55 under the capper 44, to locate the recess 14a that is empty in the holder 14 under the existing capping head 44aA.

Then, the existing capping head 44aA connected to the capper 44 is lowered by the lifting unit, and then a connected state is released, to store the existing capping head 44aA in the recess 14a of the holder 14.

Next, the control unit 1A moves the head carrier 55 to move the new capping head 44aB stored in the holder 14 to a position under a member to be connected of the lifting unit.

Then, in the capper 44, the member to be connected is brought close to the new capping head 44aB by the lifting unit. Afterward, the capping head 44aB is connected to the member to be connected, and the parts size change of the capper 44 is completed.

When the capper 44 finishes the replacement of the capping heads 44aA, 44aB in this manner, the control unit 1A moves, to the carrier stocker 51, the head carrier 55 in which the existing capping head 44aA is stored.

Accordingly, the control unit 1A moves, to the carrier stocker 51, the existing carrier 12 left on standby. Consequently, the existing carrier 12 and the capping head 44aA are stored in the carrier stocker 51, and the parts size change is completed.

Afterward, the operator removes the carrier stocker 51 from the clean booth 6, and injects a decontamination gas into the carrier stocker 51, so that the carrier 12 and the capping head 44a inside the stocker can be decontaminated.

Thus, the carrier 12 for the parts size change is stored in the carrier stocker 51, so that the carrier 12 required for the parts size change to the eyedrops container 1 comprising the parts having different shapes can be efficiently replaced.

Furthermore, the head carrier 55 that can store the capping heads 44aA, 44aB to assemble the new eyedrops container 1 is stored in the carrier stocker 51, so that the head carrier 55 can be moved to the filling and plugging parts B1, B2 and the capping heads 44aA, 44aB can be efficiently replaced.

Note that the carrier stocker 51 can be branched from an any place of the conveying unit 3. For example, the carrier stocker section 11D may be connected to the parts supply section 11A, and in this case, the carrier stocker 51 is connected to the parts supply isolator 4.

Note that in the present embodiment, as the example of the assembling apparatus, the filling line 2 has been described in which the inner plug 1b and the cap 1c are mounted to the container part 1a to assemble the eyedrops container 1, but the apparatus can also be used as an assembling apparatus that assembles another article.

What is claimed is:

1. An assembling apparatus for forming an assembly having a plurality of parts, the assembling apparatus comprising:
   a carrier configured to store the plurality of parts constituting the assembly;
   a parts supply unit for supplying the parts of the assembly to the carrier;
   an isolator having an interior maintained in an aseptic state;
   an assembling unit for mounting one of the parts of the assembly to another part of the assembly, the assembling unit being accommodated in the isolator and being located at a position away from a position at which the parts supply unit is located;
   gloves provided on a side surface of the isolator for performing an operation on the assembling unit;
   a conveying unit for moving the carrier; and
   a control unit configured to control action of the parts supply unit, the assembling unit and the conveying unit such that the parts supply unit supplies the parts constituting the assembly to the carrier, the conveying unit moves the carrier supplied with the parts of the assembly from a position at the parts supply unit to a position at the assembling unit in the isolator, and the assembling unit takes the parts of the assembly from the carrier and mounts the one part of the assembly to the other part of the assembly stored in the carrier.

2. The assembling apparatus according to claim 1, wherein the assembling unit comprises a holding head configured to hold the parts of the assembly stored in the carrier and a lifting unit for moving the holding head up and down, the control unit being configured to control the assembling unit such that the holding head is moved up and down by the lifting unit, the holding head holds the one part stored in the carrier and the holding head mounts the one part to the other part stored in the carrier from above.

3. The assembling apparatus according to claim 1, wherein the carrier is configured to store a container for a liquid, the container being one of the plurality of parts of the assembly, the assembling apparatus further comprising a filling unit for filling the container with liquid, the filling unit being disposed in the isolator at a position on an upstream side of the assembling unit in a conveying direction.

4. The assembling apparatus according to claim 1, wherein the control unit is configured to control the parts supply unit to supply a main part to the carrier, the main part being one of the plurality of parts of the assembly, on an upstream side of the carrier in a conveying direction, and to control the parts supply unit to supply a mounting part for mounting to the main part to the carrier on a downstream side of the carrier located downstream of the main part in the conveying direction, the mounting part being one of the plurality of parts of the assembly, the control unit is configured to control the conveying unit to move the carrier to the assembling unit, to control the assembling unit to hold the mounting part from the carrier, to control the conveying unit to move the carrier downstream in the conveying direction, and to control the assembling unit to mount the mounting part to the main part.

5. The assembling apparatus according to claim 4, wherein the assembling unit comprises a holding head configured to hold the mounting part stored in the carrier and a lifting unit configured to move the holding head up and down, and the control unit is configured to control the conveying unit to move the carrier so that the mounting part is located under the holding head, to control the assembling unit such that the holding head holds the mounting part, to control the conveying unit to move the carrier downstream in the conveying direction to locate the main part on the carrier under the mounting part held by the holding head, and to control the assembling unit such that the holding head is lowered to mount the mounting part to the main part.

\* \* \* \* \*

UNITED STATES PATENT AND TRADEMARK OFFICE
CERTIFICATE OF CORRECTION

PATENT NO. : 11,358,244 B2
APPLICATION NO. : 16/885822
DATED : June 14, 2022
INVENTOR(S) : Masato Ohta et al.

It is certified that error appears in the above-identified patent and that said Letters Patent is hereby corrected as shown below:

On the Title Page

Item (71):
Change "SHIBUYA CORPORATON" to --- SHIBUYA CORPORATION ---

Signed and Sealed this
Twenty-fifth Day of April, 2023

Katherine Kelly Vidal
*Director of the United States Patent and Trademark Office*